US008513319B2

(12) United States Patent
Dai et al.

(10) Patent No.: US 8,513,319 B2
(45) Date of Patent: Aug. 20, 2013

(54) MESOPOROUS CARBON MATERIALS

(75) Inventors: Sheng Dai, Knoxville, TN (US); Xiqing Wang, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/353,722

(22) Filed: Jan. 19, 2012

(65) Prior Publication Data
US 2012/0121498 A1    May 17, 2012

Related U.S. Application Data

(62) Division of application No. 12/468,946, filed on May 20, 2009, now Pat. No. 8,114,510.

(51) Int. Cl.
C08G 14/02    (2006.01)
C08G 14/04    (2006.01)
C09C 1/44     (2006.01)
C01B 31/00    (2006.01)

(52) U.S. Cl.
USPC ............. 521/180; 521/186; 521/50; 423/460; 264/29.1; 264/42

(58) Field of Classification Search
USPC .......... 521/50, 180, 186; 423/460; 264/29.1, 264/42
See application file for complete search history.

(56) References Cited

U.S. PATENT DOCUMENTS

| 4,439,349 A | 3/1984 | Everett et al. |
| 2006/0057051 A1 | 3/2006 | Dai et al. |
| 2007/0253887 A1 | 11/2007 | Foley et al. |
| 2008/0152577 A1 | 6/2008 | Addiego et al. |
| 2009/0208780 A1 | 8/2009 | Sun et al. |

OTHER PUBLICATIONS

Wang X. et al., "Facile Synthesis of Ordered Mesoporous Carbons with High Thermal Stability by Self-Assembly of Resorcinol-Formaldehyde and Block Copolymers Under Highly Acidic Conditions", *Langmuir* 24(14):7500-7505 (2008).
Lee J. et al., "Recent Progress in the Synthesis of Porous Carbon Materials", *Advanced Materials* 18(16):2073-2094 (2006).
Zhang F. et al., "A Facile Aqueous Route to Synthesize Highly Ordered Mesoporous Polymers and Carbon Frameworks with Ia3d Bicontinuous Cubic Structure", *J. Am. Chem. Soc.* 127(39):13508-13509 (2005).
Liang C. et al., "Synthesis of a Large-Scale Highly Ordered Porous Carbon Film by Self-Assembly of Block Copolymers", *Angew. Chem. Int. Ed.* 43:5785-5789 (2004).
Liang C. et al., "Mesoporous Carbon Materials: Synthesis and Modification", *Angew. Chem. Int. Ed.* 47:3696-3717 (2008).

(Continued)

*Primary Examiner* — Randy Gulakowski
*Assistant Examiner* — Kara Boyle
(74) *Attorney, Agent, or Firm* — Scully, Scott, Murphy & Presser, P.C.

(57) ABSTRACT

The invention is directed to a method for fabricating a mesoporous carbon material, the method comprising subjecting a precursor composition to a curing step followed by a carbonization step, the precursor composition comprising: (i) a templating component comprised of a block copolymer, (ii) a phenolic compound or material, (iii) a crosslinkable aldehyde component, and (iv) at least 0.5 M concentration of a strong acid having a pKa of or less than −2, wherein said carbonization step comprises heating the precursor composition at a carbonizing temperature for sufficient time to convert the precursor composition to a mesoporous carbon material. The invention is also directed to a mesoporous carbon material having an improved thermal stability, preferably produced according to the above method.

11 Claims, 7 Drawing Sheets

(56) References Cited

OTHER PUBLICATIONS

Liu C. et al., "Facile Synthesis of Ordered Mesoporous Carbons from F108/Resorcinol-Formaldehyde Composites Obtained in Basic Media", *Chem. Commun.*, pp. 757-759 (2007).

Ryoo R. et al., "Ordered Mesoporous Carbons", *Advanced Materials* *13*(9):677-681 (2001).

Liang C. et al., "Synthesis of Mesoporous Carbon Materials Via Enhanced Hydrogen-Bonding Interaction", *Journal of the American Chemical Society 128*(16):5316-5317 (2006).

Tanaka S. et al., "Synthesis of Ordered Mesoporous Carbons with Channel Structure from an Organic-Organic Nanocomposite", *Chem. Commun.*, pp. 2125-2127 (2005).

Meng Y. et al., "Ordered Mesoporous Polymers and Homologous Carbon Frameworks: Amphiphilic Surfactant Templating and Direct Transformation", *Angew. Chem. Int. Ed. 44*(43):7053-7059 (2005).

Huang Y. et al., "Formation of Mesoporous Carbon With a Face-Centered-Cubic Fd3m Structure and Bimodel Architectural Pores from the Reverse Amphiphilic Triblock Copolyer PPO-PEO-PPO", *Angew. Chem. Int. Ed. 46*:1089-1093 (2007).

International Search Report and Written Opinion dated Dec. 22, 2010 received from the Korean Intellectual Property Office from related International Application No. PCT/US2010/035345.

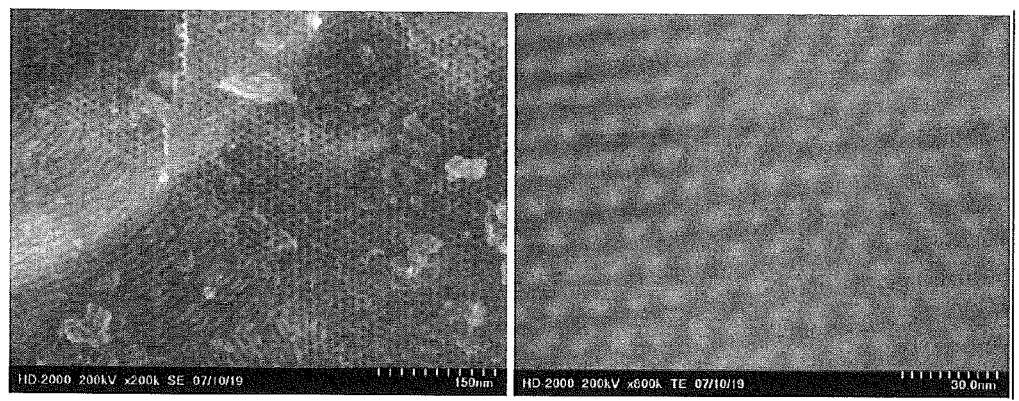
(A)            (B)
FIGS. 5A,B

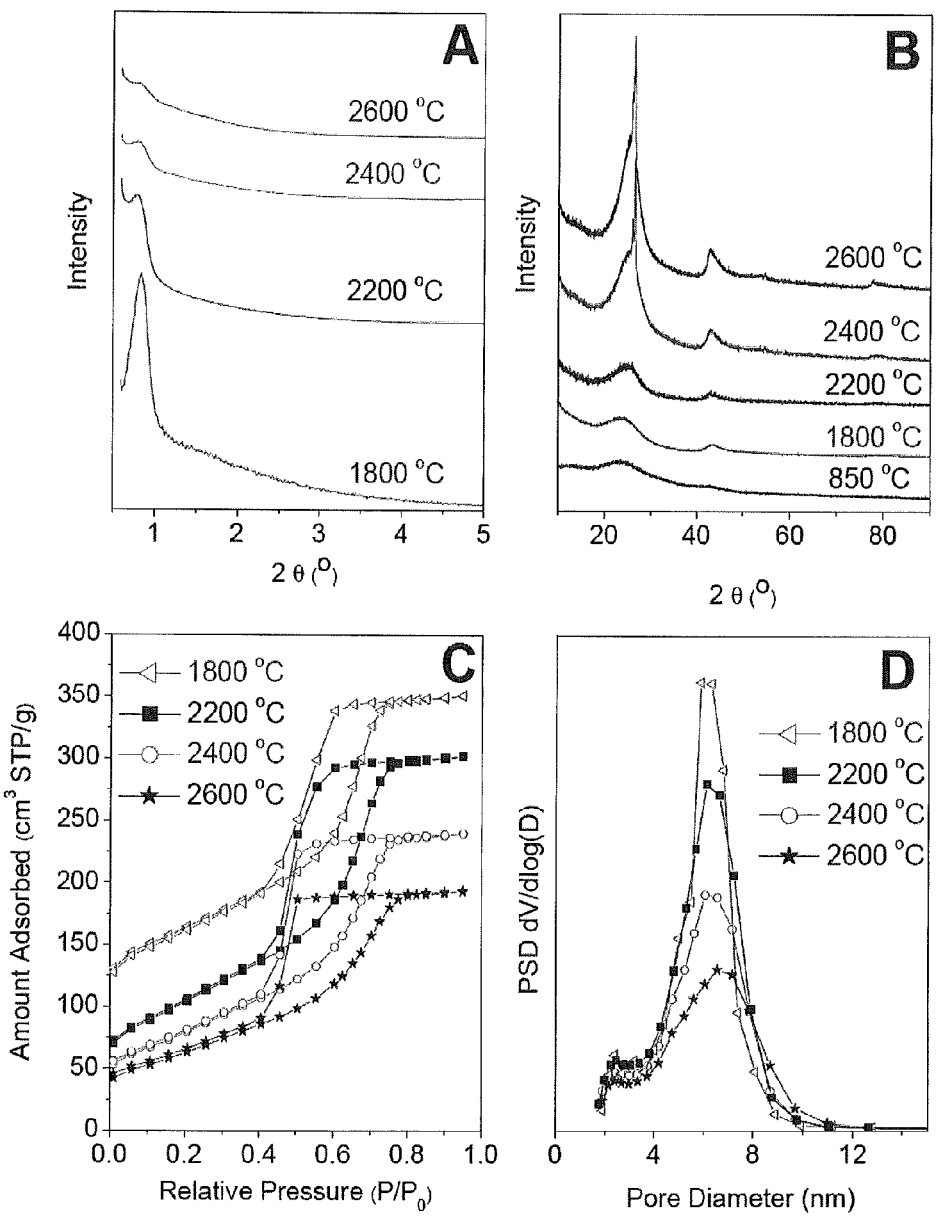
FIGS. 6A-D

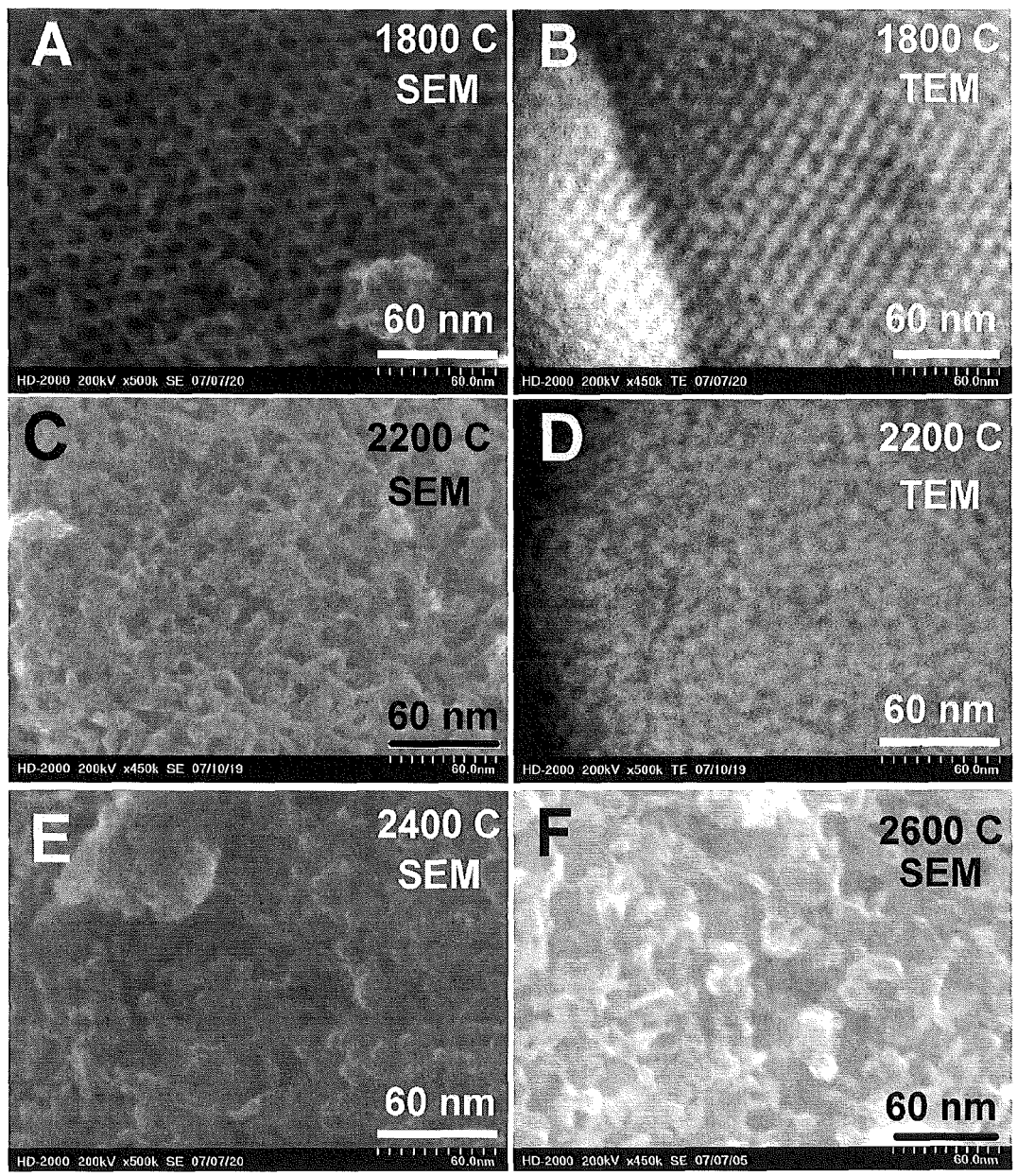
FIGS. 7A-F

MESOPOROUS CARBON MATERIALS

CROSS REFERENCE TO RELATED APPLICATIONS

This application is a divisional of U.S. patent application Ser. No. 12/468,946, filed May 20, 2009, the entire content and disclosure of which are incorporated herein by reference.

This invention was made with government support under Contract Number DE-AC05-00OR22725 between the United States Department of Energy and UT-Battelle, LLC. The U.S. government has certain rights in this invention.

FIELD OF THE INVENTION

The present invention relates to the field of porous carbon materials, and more particularly, to mesoporous carbon materials and films.

BACKGROUND OF THE INVENTION

Mesoporous carbon materials are three-dimensionally connected carbon frameworks containing pores within the size range of 2-50 nm (i.e., mesopores). These materials have found an increasing number of utilities, e.g., as gas separation, water purification (i.e., nanofiltration), catalyst support, and electrode materials.

However, there are several problems currently being encountered in the manufacture of mesoporous carbon materials. One significant problem is the difficulty (i.e., slowness) of organic precursors to react (i.e., cure) in forming a polymer which functions as a carbon framework precursor. Often, the polymer formation step is either incomplete, or alternatively, requires an excessive amount of time for curing to be completed (e.g., days or weeks). In addition, the manufacture of mesoporous carbon materials is generally conducted according to a laborious stepwise procedure, which is both time consuming and costly.

There are also several deficiencies commonly encountered in carbon mesoporous materials produced by these methods. For example, mesoporous carbon materials are generally prone at elevated temperatures (i.e., carbonization temperatures used in their manufacture) to structural shrinkage. The structural shrinkage is often accompanied by a loss of mesoporosity and an onset of microporosity. Mesoporous carbon materials, particularly films, are also prone to cracking.

Accordingly, there would be a particular benefit in a method capable of producing highly resilient mesoporous carbon materials. There would be a further benefit if such a method was more efficient and less costly than existing methods. Moreover, the applicability of the resulting mesoporous carbon materials would advantageously be expanded to the many processes that could benefit from exceptionally durable and heat-resistant mesoporous carbon materials.

SUMMARY OF THE INVENTION

In one aspect, the invention is directed to an improved method for fabricating a mesoporous carbon material. In another aspect, the invention is directed to a mesoporous carbon material produced according to the method described above.

In a preferred embodiment, the method involves subjecting a precursor composition to a curing step followed by a carbonization step, the precursor composition containing the following components: (i) a templating component comprised of a block copolymer, (ii) a phenolic compound or material, (iii) a crosslinkable aldehyde component, and (iv) at least 0.5 molar (i.e., 0.5 M) concentration of a strong acid having a pKa of less than −2, wherein the carbonization conditions involve heating the precursor composition at a carbonizing temperature for sufficient time to convert the precursor composition to a mesoporous carbon material.

By virtue of the strongly acidic conditions used (i.e., a strong acid present in a concentration of at least 0.5M), a more completely crosslinked (i.e., cured) polymeric carbonization precursor is produced. The more completely crosslinked precursor results in a mesoporous carbon material that is significantly less prone to shrinkage or cracking, particularly at elevated temperatures. Moreover, the strongly acidic conditions permit the resulting improved carbon material to be produced in significantly less time than methods of the art, even when applied to phenolic precursor compounds generally known to have a low reactivity (e.g., phenol, deactivated phenol derivatives, and polyphenol compounds of high molecular weight, such as the tannins). The highly acidic conditions also permit the method to be conveniently practiced as a one-step process, i.e., wherein all components (e.g., templating components, carbon precursors, and acid) are mixed together and subjected to curing and carbonization conditions, thereby dispensing with the multi-step processes of the art.

The resulting mesoporous carbon material possesses several advantageous properties, including an improved thermal stability as evidenced by a substantial absence of structural shrinkage, and/or a substantial preservation of mesoporosity, and/or a substantial preservation of BET surface area of the mesoporous carbon material, after subjecting the mesoporous carbon material to a heat-treatment temperature of at least 1800° C.

BRIEF DESCRIPTION OF THE DRAWINGS

FIGS. 5A,B. High-resolution SEM image (FIG. 5A) and TEM image (FIG. 5B) of C-ORNL-1-c.

FIGS. 6A-6D. Low-angle (FIG. 6A) and wide-angle (FIG. 6B) XRD patterns, nitrogen sorption isotherms (FIG. 6C), and pore size distribution plots (FIG. 6D) of C-ORNL-1 after heat-treatment at different temperatures. For clarity, the nitrogen sorption isotherm of C-ORNL-1-1800 was shifted up by 50 $cm^3$ STP/g.

FIGS. 7A-7F. High-resolution SEM images (FIGS. 7A, C, E, F) and TEM images (FIGS. 7B, D) of C-ORNL-1 after heat treatment at different temperatures.

DETAILED DESCRIPTION OF THE INVENTION

Figure 1:
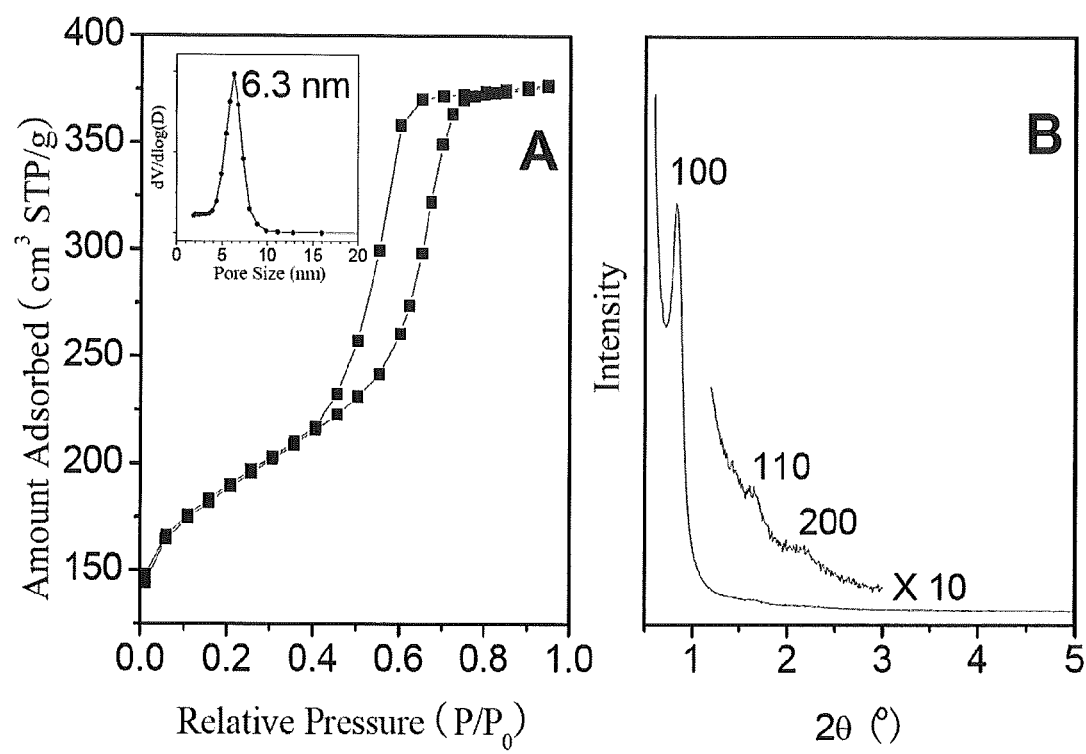
FIGS. 1A,B. Nitrogen ($N_2$) sorption isotherm (FIG. 1A) and low-angle XRD pattern (FIG. 1B) of a resorcinol/formaldehyde/F-127 poloxamer mesoporous carbon material of the invention (denoted as C-ORNL-1), along with pore size distribution plot in FIG. 1A.

In one aspect, the invention is directed to a method for fabricating a mesoporous carbon material. As used herein and as understood in the art, the term "mesoporous" indicates a material containing "mesopores", which are pores having a diameter (i.e., pore size) of between 2 and 50 nm. In contrast to mesopores, micropores (and thus, microporous materials) are generally understood to have pore diameters of less than 2 nm, whereas macropores (and thus, macroporous materials) are generally understood to have pore diameters greater than 50 nm.

The method first involves providing (i.e., preparing or otherwise obtaining in prepared form) a precursor composition which will be subjected to a curing step followed by a carbonization step in order to produce a mesoporous carbon material of the invention. The precursor composition includes at least the following components: (i) a templating component containing a block copolymer, (ii) a phenolic compound or material, (iii) a crosslinkable aldehyde component, and (iv) at least 0.5 M concentration of a strong acid having a pKa of less than −2. The combination of phenolic compound/material and the crosslinkable aldehyde are herein referred to as the "polymer precursor" or "polymer precursor components". The resulting polymer (i.e., after polymerization and crosslinking) functions as the carbonization precursor, i.e., the source of carbon upon being carbonized. In contrast, the templating component (i.e., block copolymer) functions to organize the polymer precursor materials in an ordered (i.e., patterned) arrangement before the carbonization step. During carbonization, the block copolymer is typically completely volatized into gaseous byproducts, and thereby, generally does not contribute to formation of solid carbon. However, the volatile gases serve the important role of creating the mesopores in the carbon structure during the carbonization step.

The templating component can contain one or more block copolymers. As used herein, a "block copolymer" is a polymer containing two or more chemically distinguished polymeric blocks (i.e., sections or segments). The copolymer can be, for example, a diblock copolymer (e.g., A-B), triblock copolymer (e.g., A-B-C), tetrablock copolymer (e.g., A-B-C-D), or higher block copolymer, wherein A, B, C, and D represent chemically distinct polymeric segments. The block copolymer is preferably not completely inorganic, and more preferably, completely organic (i.e., carbon-based) in order that the block copolymer is at least partially capable of volatilizing during the carbonization step. Preferably, the block copolymer contains at least two segments that possess a difference in hydrophilicity or hydrophobicity (i.e., is amphiphilic). Such block copolymers typically form periodic structures by virtue of selective interactions between like domains, i.e., between hydrophobic domains and between hydrophilic domains. The block copolymer is typically linear; however, branched (e.g., glycerol branching units) and grafted block copolymer variations are also contemplated herein. Preferably, the block copolymer contains polar groups capable of interacting (e.g., by hydrogen or ionic bonding) with the phenolic compound or material. For this reason, the block copolymer is preferably not a complete hydrocarbon such as styrene-butadiene. Some of the groups preferably located in the block copolymer which can provide a favorable interactive bond with phenol groups include, for example, hydroxy, amino, imino, and carbonyl groups.

Some general examples of suitable classes of block copolymers include those containing segments of polyacrylate or polymethacrylate (and esters thereof), polystyrene, polyethyleneoxide, polypropyleneoxide, polyethylene, polyacrylonitrile, polylactide, and polycaprolactone. Some specific examples of suitable block copolymers include polystyrene-b-poly(methylmethacrylate) (i.e., PS-PMMA), polystyrene-b-poly(acrylic acid) (i.e., PS-PAA), polystyrene-b-poly(4-vinylpyridine) (i.e., PS-P4VP), polystyrene-b-poly(2-vinylpyridine) (i.e., PS-P2VP), polyethylene-b-poly(4-vinylpyridine) (i.e., PE-P4VP), polystyrene-b-polyethyleneoxide (i.e., PS-PEO), polystyrene-b-poly(4-hydroxystyrene), polyethyleneoxide-b-polypropyleneoxide (i.e., PEO-PPO), polyethyleneoxide-b-poly(4-vinylpyridine) (i.e., PEO-P4VP), polyethylene-b-polyethyleneoxide (i.e., PE-PEO), polystyrene-b-poly(D,L-lactide), polystyrene-b-poly(methylmethacrylate)-b-polyethyleneoxide (i.e., PS-PMMA-PEO), polystyrene-b-polyacrylamide, polystyrene-b-polydimethylacrylamide (i.e., PS-PDMA), polystyrene-b-polyacrylonitrile (i.e., PS-PAN), and polyethyleneoxide-b-polyacrylonitrile (i.e., PEO-PAN).

In a preferred embodiment, the block copolymer is a triblock copolymer containing one or more poly-EO segments and one or more poly-PPO segments. More preferably, the triblock copolymer is a poloxamer (i.e. Pluronic® or Lutrol® polymer) according to the general formula $$(PEO)_a\text{-}(PPO)_b\text{-}(PEO)_c \qquad (1)$$

wherein PEO is a polyethylene oxide block and PPO is a polypropylene block (i.e., —CH$_2$CH(CH$_3$)O— or —CH(CH$_3$)CH$_2$O—), and the subscripts a, b, and c represent the number of monomer units of PEO and PPO, as indicated. Typically, a, b, and c are each at least 2, and more typically, at least 5, and typically up to a value of 100, 120, or 130. Subscripts a and c are typically of equal value in these types of polymers. In different embodiments, a, b, and c can independently have a value of about, or at least, or up to 10, 20, 30, 40, 50, 60, 70, 80, 90, 100, 120, 130, 140, 150, 160, 180, 200, 220, 240, or any particular range established by any two of these exemplary values.

In one embodiment, a and c values are each less than b, i.e., the hydrophilic PEO block is shorter on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each less than b. Furthermore, in different embodiments, it can be preferred for the a and c values to be less than b by a certain number of units, e.g., by 2, 5, 7, 10, 12, 15, 20, 25, 30, 35, 40, 45, or 50 units, or any range therein. Alternatively, it can be preferred for the a and c values to be a certain fraction or percentage of b (or less than or greater than this fraction or percentage), e.g., about 10%, 20%, 25%, 30, 33%, 40%, 50%, 60%, 70%, 75%, 80%, 85%, 90%, or any range delimited by any two of these values.

In another embodiment, a and c values are each greater than b, i.e., the hydrophilic PEO block is longer on each end than the hydrophobic PPO block. For example, in different embodiments, a, b, and c can each independently have a value of 2, 5, 7, 10, 12, 15, 20, 25, 30, 35, 40, 45, 50, 55, 60, 65, 70, 75, 80, 85, 90, 95, 100, 110, 120, 130, 140, 150, or 160, or any range delimited by any two of these values, provided that a and c values are each greater than b. Furthermore, in different embodiments, it can be preferred for the a and c values to be greater than b by a certain number of units, e.g., by 2, 5, 7, 10, 12, 15, 20, 25, 30, 35, 40, 45, or 50 units, or any range therein. Alternatively, it can be preferred for the b value to be a certain fraction or percentage of a and c values (or less than or greater than this fraction or percentage), e.g., about 10%, 20%, 25%, 30, 33%, 40%, 50%, 60%, 70%, 75%, 80%, 85%, 90%, or any range delimited by any two of these values.

In different embodiments, the poloxamer preferably has a minimum average molecular weight of at least 500, 800, 1000, 1200, 1500, 2000, 2500, 3000, 3500, 4000, or 4500 g/mole, and a maximum average molecular weight of 5000, 5500, 6000, 6500, 7000, 7500, 8000, 8500, 9000, 9500, 10,000, 12,000, 15,000, or 20,000 g/mole, wherein a particular range can be established between any two of the foregoing values, and particularly, between any two the minimum and maximum values. The viscosity of the polymers is generally at least 200, 250, 300, 350, 400, 450, 500, 550, 600, or 650 centipoise (cps), and generally up to 700, 800, 900, 1000, 1500, 2000, 2500, 3000, 3500, 4000, 4500, 5000, 5500, 6000, 6500, 7000, or 7500 cps, or any particular range established between any two of the foregoing values.

The following table lists several exemplary poloxamer polymers applicable to the present invention.

TABLE 1

Some exemplary poloxamer polymers

| Generic Name | Pluronic ® Name | Approximate value of a | Approximate value of b | Approximate value of c |
|---|---|---|---|---|
| Poloxamer 101 | Pluronic L-31 | 2 | 16 | 2 |
| Poloxamer 105 | Pluronic L-35 | 11 | 16 | 11 |
| Poloxamer 108 | Pluronic F-38 | 46 | 16 | 46 |
| Poloxamer 122 | — | 5 | 21 | 5 |
| Poloxamer 123 | Pluronic L-43 | 7 | 21 | 7 |
| Poloxamer 124 | Pluronic L-44 | 11 | 21 | 11 |
| Poloxamer 181 | Pluronic L-61 | 3 | 30 | 3 |
| Poloxamer 182 | Pluronic L-62 | 8 | 30 | 8 |
| Poloxamer 183 | — | 10 | 30 | 10 |
| Poloxamer 184 | Pluronic L-64 | 13 | 30 | 13 |
| Poloxamer 185 | Pluronic P-65 | 19 | 30 | 19 |
| Poloxamer 188 | Pluronic F-68 | 75 | 30 | 75 |
| Poloxamer 212 | — | 8 | 35 | 8 |
| Poloxamer 215 | — | 24 | 35 | 24 |
| Poloxamer 217 | Pluronic F-77 | 52 | 35 | 52 |
| Poloxamer 231 | Pluronic L-81 | 6 | 39 | 6 |
| Poloxamer 234 | Pluronic P-84 | 22 | 39 | 22 |
| Poloxamer 235 | Pluronic P-85 | 27 | 39 | 27 |
| Poloxamer 237 | Pluronic F-87 | 62 | 39 | 62 |
| Poloxamer 238 | Pluronic F-88 | 97 | 39 | 97 |
| Poloxamer 282 | Pluronic L-92 | 10 | 47 | 10 |
| Poloxamer 284 | — | 21 | 47 | 21 |
| Poloxamer 288 | Pluronic F-98 | 122 | 47 | 122 |
| Poloxamer 331 | Pluronic L-101 | 7 | 54 | 7 |
| Poloxamer 333 | Pluronic P-103 | 20 | 54 | 20 |
| Poloxamer 334 | Pluronic P-104 | 31 | 54 | 31 |
| Poloxamer 335 | Pluronic P-105 | 38 | 54 | 38 |
| Poloxamer 338 | Pluronic F-108 | 128 | 54 | 128 |
| Poloxamer 401 | Pluronic L-121 | 6 | 67 | 6 |
| Poloxamer 403 | Pluronic P-123 | 21 | 67 | 21 |
| Poloxamer 407 | Pluronic F-127 | 98 | 67 | 98 |

As known in the art, the names of the poloxamers and Pluronics (as given above) contain numbers which provide information on the chemical composition. For example, the generic poloxamer name contains three digits, wherein the first two digits×100 indicates the approximate molecular weight of the PPO portion and the last digit×10 indicates the weight percent of the PEO portion. Accordingly, poloxamer 338 possesses a PPO portion of about 3300 g/mole molecular weight, and 80 wt % PEO. In the Pluronic name, the letter indicates the physical form of the product, i.e., L=liquid, P=paste, and F=solid, i.e., flake. The first digit, or two digits for a three-digit number, multiplied by 300, indicates the approximate molecular weight of the PPO portion, while the last digit×10 indicates the weight percent of the PEO portion. For example, Pluronic® F-108 (which corresponds to poloxamer 338) indicates a solid form composed of about 3,000 g/mol of the PPO portion and 80 wt % PEO.

Numerous other types of copolymers containing PEO and PPO blocks are possible, all of which are applicable herein. For example, the block copolymer can also be a reverse poloxamer of general formula:

$$(PPO)_a\text{-}(PEO)_b\text{-}(PPO)_c \qquad (2)$$

wherein all of the details considered above with respect to the regular poloxamers (e.g., description of a, b, and c subscripts, and all of the other exemplary structural possibilities) are applicable by reference herein to the reverse poloxamers.

In another variation, the block copolymer contains a linking diamine group (e.g., ethylenediamine, i.e., EDA) or triamine group (e.g., melamine). Some examples of such copolymers include the Tetronics® (e.g., PEO-PPO-EDA-PPO-PEO) and reverse Tetronics® (e.g., PPO-PEO-EDA-PEO-PPO).

The phenolic compound or material of the precursor composition can be any phenolic compound or material that can react by a condensation reaction with an aldehydic compound or material (e.g., formaldehyde) under acidic conditions. Typically, any compound or material containing a hydroxy group bound to an aromatic ring (typically, a phenyl ring) is suitable for the present invention as a phenolic compound or material.

In one embodiment, the phenolic compound or material contains one phenol group (i.e., one hydroxy group bound to a six-membered aromatic ring). Some examples of such compounds include phenol, the halophenols, the aminophenols, the hydrocarbyl-substituted phenols (wherein "hydrocarbyl" includes, e.g., straight-chained, branched, or cyclic alkyl, alkenyl, or alkynyl groups typically containing from 1 to 6 carbon atoms, optionally substituted with one or more oxygen or nitrogen atoms), naphthols, nitrophenols, hydroxyanisoles, hydroxybenzoic acids, fatty acid ester-substituted or polyalkyleneoxy-substituted phenols (e.g., on the 2 or 4 positions with respect to the hydroxy group), phenols containing an azo linkage (e.g., p-hydroxyazobenzene), and phenolsulfonic acids (e.g., p-phenolsulfonic acid). Some general subclasses of halophenols include the fluorophenols, chlorophenols, bromophenols, and iodophenols, and their further subclassification as, for example, p-halophenols (e.g., 4-fluorophenol, 4-chlorophenol, 4-bromophenol, and 4-iodophenol), m-halophenols (e.g., 3-fluorophenol, 3-chlorophenol, 3-bromophenol, and 3-iodophenol), o-halophenols (e.g., 2-fluorophenol, 2-chlorophenol, 2-bromophenol, and 2-iodophenol), dihalophenols (e.g., 3,5-dichlorophenol and 3,5-dibromophenol), and trihalophenols (e.g., 3,4,5-trichlorophenol, 3,4,5-tribromophenol, 3,4,5-trifluorophenol, 3,5,6-trichlorophenol, and 2,3,5-tribromophenol). Some examples of aminophenols include 2-, 3-, and 4-aminophenol, and 3,5- and 2,5-diaminophenol. Some examples of nitrophenols include 2-, 3-, and 4-nitrophenol, and 2,5- and 3,5-dinitrophenol. Some examples of hydrocarbyl-substituted phenols include the cresols, i.e., methylphenols or hydroxytoluenes (e.g., o-cresol, m-cresol, p-cresol), the xylenols (e.g., 3,5-, 2,5-, 2,3-, and 3,4-dimethylphenol), the ethylphenols (e.g., 2-, 3-, and 4-ethylphenol, and 3,5- and 2,5-diethylphenol), n-propylphenols (e.g., 4-n-propylphenol), isopropylphenols (e.g., 4-isopropylphenol), butylphenols (e.g., 4-n-butylphenol, 4-isobutylphenol, 4-t-butylphenol, 3,5-di-t-butylphenol, 2,5-di-t-butylphenol), hexylphenols, octyl phenols (e.g., 4-n-octylphenol), nonylphenols (e.g., 4-n-nonylphenol), phenylphenols (e.g., 2-phenylphenol, 3-phenylphenol, and 4-phenylphenol), and hydroxycinnamic acid (p-coumaric acid). Some examples of hydroxyanisoles include 2-methoxyphenol, 3-methoxyphenol, 4-methoxyphenol, 3-t-butyl-4-hydroxyanisole (e.g., BHA), and ferulic acid. Some examples of hydroxybenzoic acids include 2-hydroxybenzoic acid (salicylic acid), 3-hydroxybenzoic acid, 4-hydroxybenzoic acid, and their organic acid esters (e.g., methyl salicylate and ethyl-4-hydroxybenzoate).

In another embodiment, the phenolic compound or material contains two phenol groups. Some examples of such compounds include catechol, resorcinol, hydroquinone, the hydrocarbyl-linked bis-phenols (e.g., bis-phenol A, methylenebisphenol, and 4,4'-dihydroxystilbene), 4,4'-biphenol, the halo-substituted diphenols (e.g., 2-haloresorcinols, 3-haloresorcinols, and 4-haloresorcinols, wherein the halo group can be fluoro, chloro, bromo, or iodo), the amino-substituted diphenols (e.g., 2-aminoresorcinol, 3-aminoresorcinol, and 4-aminoresorcinol), the hydrocarbyl-substituted diphenols (e.g., 2,6-dihydroxytoluene, i.e., 2-methylresorcinol; 2,3-, 2,4-, 2,5-, and 3,5-dihydroxytoluene, 1-ethyl-2,6-dihydroxybenzene, caffeic acid, and chlorogenic acid), the nitro-substituted diphenols (e.g., 2- and 4-nitroresorcinol), dihydroxyanisoles (e.g., 3,5-, 2,3-, 2,5-, and 2,6-dihydroxyanisole, and vanillin), dihydroxybenzoic acids (e.g., 3,5-, 2,3-, 2,5-, and 2,6-dihydroxybenzoic acid, and their alkyl esters, and vanillic acid), and phenolphthalein.

In another embodiment, the phenolic compound or material contains three phenol groups. Some examples of such compounds include phloroglucinol (1,3,5-trihydroxybenzene), pyrogallol (1,2,3-trihydroxybenzene), 1,2,4-trihydroxybenzene, 5-chloro-1,2,4-trihydroxybenzene, resveratrol (trans-3,5,4'-trihydroxystilbene), the hydrocarbyl-substituted triphenols (e.g., 2,4,6-trihydroxytoluene, i.e., methylphloroglucinol, and 3,4,5-trihydroxytoluene, the halogen-substituted triphenols (e.g., 5-chloro-1,2,4-trihydroxybenzene), the carboxy-substituted triphenols (e.g., 3,4,5-trihydroxybenzoic acid, i.e., gallic acid or quinic acid, and 2,4,6-trihydroxybenzoic acid), the nitro-substituted triphenols (e.g., 2,4,6-trihydroxynitrobenzene), and phenol-formaldehyde resoles or novolak resins containing three phenol groups.

In yet another embodiment, the phenolic compound or material contains multiple (i.e., greater than three) phenol groups. Some examples of such compounds or materials include tannin (e.g., tannic acid), tannin derivatives (e.g., ellagotannins and gallotannins), phenol-containing polymers (e.g., poly-(4-hydroxystyrene)), phenol-formaldehyde resoles or novolak resins containing at least four phenol groups (e.g., at least 4, 5, or 6 phenol groups), quercetin, ellagic acid, and tetraphenol ethane.

The crosslinkable aldehyde component can be any organic compound or material containing an aldehyde group. Typically, the crosslinkable aldehyde is formaldehyde. However, there are also numerous organoaldehydes, organodialdehydes, and polyaldehydes (e.g., organotrialdehydes, organotetraaldehydes, and so on) considered herein which can serve the same purpose. The organoaldehydes can be generally represented by the following formula:

$$R\text{—}CHO \quad (3)$$

wherein R can represent a straight-chained, branched, or cyclic, and either saturated or unsaturated hydrocarbyl group, typically containing at least 1, 2, or 3 carbon atoms, and up to 4, 5, 6, 7, or 8 carbon atoms. Some examples of suitable organoaldehydes include acetaldehyde, propanal (propionaldehyde), butanal (butyraldehyde), pentanal (valeraldehyde), hexanal, crotonaldehyde, acrolein, benzaldehyde, and furfural.

The organodialdehydes can be generally represented by the following formula:

$$OHC\text{—}R\text{—}CHO \quad (4)$$

wherein R is a straight-chained, branched, or cyclic, and either saturated or unsaturated, hydrocarbyl linking group, typically containing at least 1, 2, or 3 carbon atoms, and up to 4, 5, 6, 7, 8, 9, or 10 carbon atoms. Some examples of dialdehyde compounds include glyoxal, malondialdehyde, succinaldehyde, glutaraldehyde, adipaldehyde, pimelaldehyde, suberaldehyde, sebacaldehyde, cyclopentanedialdehyde, terephthaldehyde, and furfuraldehyde.

The strong acid component contains one or more acids having a pKa of or less than about −2. Some examples of such acids include hydrochloric acid, hydrobromic acid, hydroiodic acid, sulfuric acid, and the superacids, such as triflic acid. In the method, a molar concentration of at least 0.5 molar (i.e., 0.5 M) with respect to the total volume of precursor composition is preferred. In particular embodiments, the molar concentration of the acid can preferably be about or at least 0.5 M, 0.6 M, 0.7 M, 0.8 M, 1.0 M, 1.2 M, 1.5 M, 1.8 M, 2.0 M, or any range established between any two of the foregoing values. The molar concentration values given may also be referred to in terms of molar equivalents of $H^+$, or pH, wherein the pH for a strong acid generally abides by the formula $pH = -\log[H^+]$, wherein $[H^+]$ represents the concentration of $H^+$ ions.

Any one or more of the above components may also be dissolved in a suitable solvent. Preferably, the solvent is an organic polar protic or non-protic solvent. Some examples of organic polar protic solvents include alcohols, e.g., methanol, ethanol, n-propanol, isopropanol, ethylene glycol, and the like. Some examples of organic polar non-protic solvents include acetonitrile, dimethylformamide, dimethylsulfoxide, methylene chloride, organoethers (e.g., tetrahydrofuran or diethylether), and the like.

In a particular embodiment, an orthoacetate, e.g., triethyl orthoacetate, is excluded from the precursor composition. In another particular embodiment, a weak acid (i.e., having a pKa above −2), and particularly, the weak organic acids (e.g., p-toluenesulfonic acid or hypophosphorous acid), are excluded from the precursor composition. In yet another particular embodiment, a phenol-formaldehyde resole or novolak resin (e.g., those of 500-5000 M.W.) is excluded from the precursor composition.

In one embodiment, a multi-step process is employed by including one or more steps before the curing and/or carbonization steps. For example, a multi-step process may be employed wherein a film of the templating component in combination with the phenolic compound or material is first produced by, for example, applying (i.e., coating) said components onto a surface, and casting the components as a solid film by removing solvent therefrom (e.g., by annealing). The produced film may then be reacted with the crosslinkable aldehyde component (e.g., by a vapor phase reaction with, for example, formaldehyde vapor) under strong acid conditions to produce the polymerized (and optionally, crosslinked) carbon precursor material. The resulting cured film can then be carbonized to produce the mesoporous carbon material.

However, the highly acidic condition employed in the current invention (i.e., use of a strong acid of or less than a pKa less than −2 and at a concentration of at least 0.5 M) advantageously permits a one-step (i.e., "one-pot") preparative method. In the one-step method, all components, as described above, are combined directly before the curing and carbonization steps.

The curing step includes any of the conditions, as known in the art, which promote polymerization, and preferably, crosslinking, of polymer precursors, and in particular, crosslinking between phenolic and aldehydic components. The curing conditions generally include application of an elevated temperature for a specified period of time. However, other curing conditions and methods are contemplated herein, including radiative (e.g., UV curing) or purely chemical (i.e., without use of an elevated temperature). Preferably, the curing step involves subjecting the polymer precursors or the entire precursor composition to a temperature of at least 60, 70, 80, 90, 100, 110, 120, 130, or 140° C. for a time period of, typically, at least 0.5, 1, 2, 5, 10, or 12 hours and up to 15, 20, 24, 36, 48, or 72 hours, wherein it is understood that higher temperatures generally require shorter time periods.

In particular embodiments, it may be preferred to subject the precursors to an initial lower temperature curing step followed by a higher temperature curing step. The initial curing step may employ a temperature of about, for example, 60, 70, 80, 90, or 100° C. (or a range between any of these), while the subsequent curing step may employ a temperature of about, for example, 90, 100, 110, 120, 130, or 140° C. (or a range between any of these), provided that the temperature of the initial curing step is less than the temperature of the subsequent curing step. In addition, each curing step can employ any of the exemplary time periods given above.

Alternatively, it may be preferred to gradually increase the temperature during the curing step between any of the temperatures given above, or between room temperature (e.g., 15, 20, 25, 30, or 35° C.) and any of the temperatures given above. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, or 30° C./min, or any suitable range between any of these values. The gradual temperature increase can also include one or more periods of residency at a particular temperature, and/or a change in the rate of temperature increase.

The carbonization step includes any of the conditions, as known in the art, which cause carbonization of the precursor composition. Generally, in different embodiments, a carbonization temperature of about or at least 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., or 1800° C. is employed for a time period of, typically, at least 1, 2, 3, 4, 5, or 6 hours and up to 7, 8, 9, 10, 11, or 12 hours, wherein it is understood that higher temperatures generally require shorter time periods to achieve the same result. If desired, the precursor composition, or alternatively, the carbonized material, can be subjected to a temperature high enough to produce a graphitized carbon material. Typically, the temperature capable of causing graphitization is a temperature of or greater than about 2000° C., 2100° C., 2200° C., 2300° C., 2400° C., 2500° C., 2600° C., 2700° C., 2800° C., 2900° C., 3000° C., 3100° C., or 3200° C., or a range between any two of these temperatures. Preferably, the carbonization or graphitization step is conducted in an atmosphere substantially removed of oxygen, e.g., typically under an inert atmosphere. Some examples of inert atmospheres include nitrogen and the noble gases (e.g., helium or argon).

In particular embodiments, it may be preferred to subject the precursors to an initial lower temperature carbonization step followed by a higher temperature carbonization step. The initial carbonization step may employ a temperature of about, for example, 300, 350, 400, 450, 500, 550, 600, 650, 700, 750, 800, 850, or 900° C. (or a range between any of these), while the subsequent carbonization step may employ a temperature of about, for example, 500, 550, 600, 650, 700, 750, 800, 850, 900, 950, 1000, 1050, 1100, 1200, 1250, 1300, 1400, 1450, 1500, 1600, 1700, or 1800° C. (or a range between any of these), provided that the temperature of the initial carbonization step is less than the temperature of the subsequent carbonization step. In addition, each carbonization step can employ any of the exemplary time periods given above.

Alternatively, it may be preferred to gradually increase the temperature during the carbonization step between any of the temperatures given above, or between room temperature (e.g., 15, 20, 25, 30, or 35° C.) and any of the temperatures given above. In different embodiments, the gradual increase in temperature can be practiced by employing a temperature increase rate of, or at least, or no more than 1° C./min, 2° C./min, 3° C./min, 5° C./min, 7° C./min, 10° C./min, 12° C./min, 15° C./min, 20° C./min, 30° C./min, 40° C./min, or 50° C./min, or any suitable range between any of these values. The gradual temperature increase can also include one or more periods of residency at a particular temperature, and/or a change in the rate of temperature increase.

In a preferred embodiment, after combining the components of the precursor composition, and before curing or carbonization, the solution is stirred for a sufficient period of time (e.g., at least or about 1, 2, 5, 10, 20, 30, 40, 50, 60, 90, or 120 minutes, or a range between any these values) until the solution turns turbid. The turbidity indicates formation of an ordered nanocomposite gel or solid which has undergone a degree of phase separation from the liquid portion of the solution. If desired, stirring can be continued after the onset of turbidity, such that the total amount of stirring time before curing, carbonization, or a phase-separation process is any of the exemplary time periods given above, or a much longer period of time, such as several hours (e.g., at least or about 4, 5, 6, 7, 8, 10, or 12 hours) or days (e.g., at least or about 1, 2, 3, 4, 5, 10, 15, or 20 days), or a range between of the foregoing exemplary periods of time.

More preferably, after turbidity becomes evident, the phase-separated mixture is subjected to conditions that cause the ordered nanocomposite gel or solid to be isolated from the liquid portion (i.e., phase separation conditions). Any separation method can be applied herein. In a preferred embodiment, the phases are separated by centrifugation. In different embodiments, the centrifugation can be conducted at an angular speed of or at least, for example, 2000 rpm, 2500 rpm, 3000 rpm, 4000 rpm, 5000 rpm, 6000 rpm, 7000 rpm, 8000 rpm, 9000 rpm, 9500 rpm, 10000 rpm, 11000 rpm, 12000 rpm, or 15000 rpm, or a range between any of these values, for a period of time of, for example, 0.1, 0.2, 0.5, 1, 2, 3, 4, 5, or 6 minutes, wherein it is understood that higher angular speeds generally require less amounts of time to effect an equivalent degree of separation. Superspeed centrifugation (e.g., up to 20,000 or 30,000 rpm) or ultracentrifugation (e.g., up to 40,000, 50,000, 60,000, or 70,000 rpm) can also be used. The gel or solid phase, once separated from the liquid phase, is preferably cured and carbonized in the substantial absence of the liquid phase according to any of the conditions described above for these processes.

In a particular embodiment, the produced mesoporous carbon material is in the form of a film. The film can have any suitable thickness. In different embodiments, the film may preferably have a thickness of, or at least, or less than 50 nm, 100 nm, 200 nm, 300 nm, 400 nm, 500 nm, 600 nm, 700 nm, 800 nm, 900 nm, 1.0 μm, 1.2 μm, 1.5 μm, 2.0 μm, 2.5 μm, 3.0 μm, 4.0 μm, 5.0 μm, 10 μm, 20 μm, 30 μm, 40 μm, or 50 μm, or a range between any of these values. The film may also desirably function as part of a composite material, wherein the carbon film either overlays, underlies, or is sandwiched between one or more layers of other material. The other material may be porous or non-porous, and can be composed of, for example, silica, alumina, graphite, a metal oxide, or organic, inorganic, or hybrid polymer.

In another embodiment, the produced mesoporous carbon material is in the form of particles. The particles can be produced by any suitable method, such as, for example, the spray atomization techniques known in the art which also include a capability of heating at carbonization temperatures. For example, the precursor composition described above (typically, in a carrier solvent, such as THF or DMF) can be sprayed through the nozzle of an atomizer, and the particulates directed into one or more heated chambers for curing and carbonization steps. Alternatively, a portion of the precursor composition (e.g., templating agent and one of the polymer precursors, such as the phenolic) may first be atomized and the resulting particles annealed (i.e., dried) by suitable conditions; the resulting particles then exposed to the other polymer precursor (e.g., formaldehyde) and subjected to strong acid conditions (as described above), followed by curing and carbonization conditions. In different embodiments, the particles are at least or about, for example, 50 nm, 100 nm, 200 nm, 500 nm, 1 μm, 2 μm, 5 μm, 10 μm, 50 μm, 100 μm, 500 μm, or 1000 μm, or a range between any two of these values.

The mesoporous carbon material can also be functionalized, as desired, by methods known in the art for functionalizing carbon or graphite materials. For example, the carbon material may be nitrogenated, fluorinated, or oxygenated by methods known in the art. The carbon material may be nitrogenated, fluorinated, or oxygenated, by, for example, exposure of the carbon film, either during or after the carbonization process, to, respectively, ammonia, fluorine gas, or oxygen under suitably reactive conditions. In the particular case of fluorination, the carbon material is typically placed in contact with fluorine gas for a period of several minutes (e.g., 10 minutes) up to several days at a temperature within 20° C. to 500° C., wherein the time and temperature, among other factors, are selected based on the degree of fluorination desired. For example, a reaction time of about 5 hours at ambient temperature (e.g., 15-30° C.) typically results in fluorination of about 10% of the total carbon; in comparison, fluorination conducted at about 500° C. for two days results in about 100% fluorination of the total carbon. In particular embodiments, the degree of nitrogenation, fluorination, or oxygenation can be about or at least 1%, 2%, 5%, 10%, 20%, 30%, 40%, 50%, 60%, 70%, 80%, 90%, 95%, or 100%, or a range between any two of these values.

The produced mesoporous carbon material contains mesopores, i.e., pores having a diameter (i.e., pore size) of 2 to 50 nm. Preferably, the carbon material possesses the mesopores in the substantial absence of micropores (pores of less than 2 nm) or macropores (pores of more than 50 nm). By a "substantial absence" of micropores or macropores is meant that no more than 5%, and more preferably, no more than about 1%, 0.5%, or 0.1% of the total pore volume is due to the presence of micropores or macropores. In different embodiments, the carbon material preferably possesses mesopores having a size (diameter) of about 2, 3, 4, 5, 6, 7, 8, 9, 10, 12, 15, 20, 25, 30, 35, 40, 45, or 50 nm, or a range between any two of these values. The pores of the carbon material can also possess a level of size uniformity, i.e., in pore diameters and/or pore shape. For example, in different embodiments, the pores of the carbon material may possess an average pore diameter corresponding to any of the diameters exemplified above, subject to a degree of variation of no more than, for example, ±10 nm, ±8 nm, ±6, nm, ±5 nm, ±4 nm, ±3 nm, ±2 nm, or ±1 nm. The wall thickness of the mesopores is typically within the range of about 5.0-7.0 nm, e.g., 5.0, 5.5, 6.0, 6.5, or 7.0 nm, or a range between any two of these values.

Preferably, the mesopores are arranged relative to each other with a certain degree of order (i.e., in a patterned or ordered arrangement). Some examples of ordered arrangements include a hexagonal or cubic arrangement.

In addition, the longitudinal dimension of the mesopores can have a particular orientation with respect to the surface, particularly for the case of a film. For example, in one embodiment, it is preferred for the longitudinal dimension of the mesopores to be oriented either completely perpendicular to the surface (i.e., precisely 90°), or substantially perpendicular to the surface, e.g., 90±10° (i.e., 80° to −80°), 90±5°, 90±2°, or 90±1° with respect to the surface. An orientation of mesopores substantially perpendicular to the surface is particular advantageous for the case when the carbon material (typically, a film or membrane) is applied as a gas-permeable material. In another embodiment, it may be preferred for a substantial portion of pores to have a longitudinal dimension oriented obliquely to the surface within a range of angles of, e.g., 45° to −45°, 60° to −60°, 70° to −70°, or 80° to −80°, with respect to the surface. In yet another embodiment, it is preferred for the longitudinal dimension of the mesopores to be oriented either completely aligned (i.e., parallel) with the surface (i.e., precisely 0°), or substantially aligned to the surface, e.g., 0±10°, 0±5°, 0±2°, or 0±1° with respect to the surface. A selected orientation of pores can be accomplished by, for example, carbonizing a block of precursor material and then slicing or etching a selected surface having a desired angle with respect to the longitudinal dimensions of the pores. A selected orientation of pores may also be accomplished by, for example, adjusting the angle of the carbon material and/or by compression by an overlayer during the carbonization step.

The mesoporous carbon material typically possesses a BET surface area of about or at least 50, 100, 200, 300, 400, 450, 500, 550, 600, 650, 700, 750, or 800 m$^2$/g, or a range between any two of these values. The mesoporous carbon material typically possesses a pore volume of about or at least 0.2, 0.25, 0.3, 0.35, 0.4, 0.45, 0.5, 0.55, 0.6, 0.65, or 0.7 cm$^3$/g, or a range between any two of these values.

The mesoporous carbon material produced according to the method described above preferably possesses an improved physical resilience, such as an improved thermal stability and resistance to cracking. An improved thermal stability is preferably evidenced by a substantial absence of structural shrinkage, and/or a substantial preservation of mesoporosity, and/or a substantial preservation of the BET surface area after being heat-treated at a temperature of at least 1800° C. In more preferred embodiments, the improved thermal stability is evidenced after heat treating the mesoporous carbon material at a temperature of at least 1850° C., 1900° C., 1950° C., 2000° C., 2050° C., 2100° C., 2150° C., 2200° C., 2250° C., 2300° C., 2350° C., 2400° C., 2450° C., 2500° C., 2550° C., 2600° C., 2650° C., or 2700° C., or a range between any two of the foregoing values. A "substantial absence of structural shrinkage" and a "substantial preservation of BET surface area" as used herein generally means that either of these parameters change by no more than about 5%, and more preferably, no more than about 1%, 0.5%, or 0.1% after heat treatment as compared to the original value before heat treatment. A "substantial preservation of mesoporosity" as used herein generally means that the pore volume due to micropores or macropores does not increase by more than about 5%, and more preferably, no more than about 1%, 0.5%, or 0.1%, as compared to the total pore volume.

Without being bound by any theory, it is believed that the highly acidic condition employed in the present invention is primarily responsible for imparting the observed enhanced physical properties. In particular, it is believed that the highly acidic condition promotes a self-assembly mechanism by a Coulombic (i.e., ionic) interaction between phenol groups and templating groups, as opposed to a hydrogen-bonding interaction which dominates the self-assembly mechanism under weaker acidic conditions. Since ionic interactions are known to be generally stronger than hydrogen bonding interactions, the ionic interaction is believed to more firmly fix the self-assembled precursors in position, and thereby produce a more rigid and non-labile scaffold before carbonization. The highly rigid scaffold produces a stronger and more resilient carbon material after carbonization as compared to carbon materials prepared under weaker acidic conditions.

Examples have been set forth below for the purpose of illustration and to describe certain specific embodiments of the invention. However, the scope of this invention is not to be in any way limited by the examples set forth herein.

EXAMPLE 1

Preparation and Analysis of Mesoporous Carbon Material from Resorcinol-Formaldehyde Polymer (C-ORNL-1)

Mesoporous carbons with highly ordered structure were prepared using weight ratios of 1.1 resorcinol:1.1 F127:0.48 formaldehyde:3.55-8.2 ethanol:5.1-1.67 water:0.16-0.66 HCl. In a typical synthesis, 1.1 g of resorcinol and 1.1 g of F127 were dissolved in 4.5 ml of ethanol (EtOH), and to this was added 4.5 ml of 3.0M HCl aqueous solution and 1.3 g of 37% formaldehyde (37%) was then added. After stirring for 12-13 min. at room temperature, the clear mixture turned turbid, indicating the formation of the ordered nanocomposite and a phase separation. After stirring for a total of 40 minutes, the mixture was centrifuged at 9500 rpm for 4 minutes in order to completely separate and isolate the polymer-rich gel phase. The gel was then loaded on a large Petri dish and cured at 80° C. and subsequently 150° C. for 24 hours each. Carbonization was carried out under nitrogen atmosphere at 400° C. for 2 hours at a heating rate of 1° C./min followed by further treatment at 850° C. for 3 hours at a heating rate of 5° C./min. The produced carbon material is referred to as C-ORNL-1.

Figure 2:
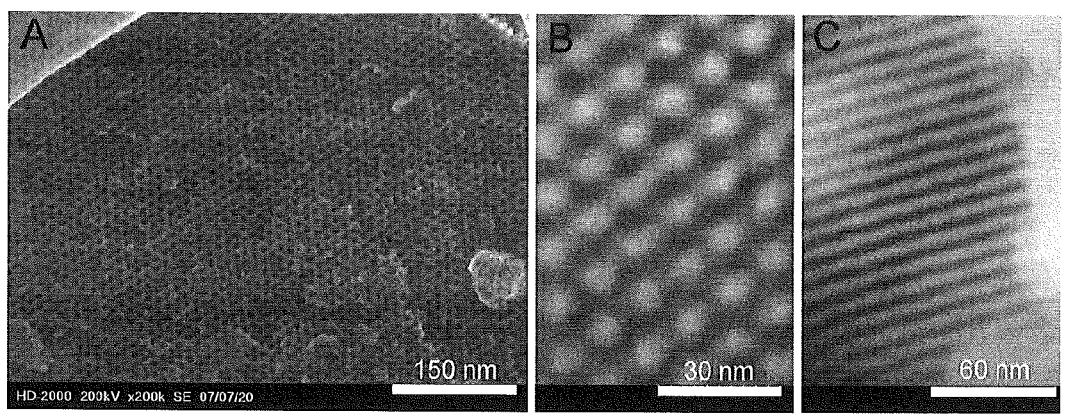
FIGS. 2A-2C. High-resolution SEM image (FIG. 2A) and TEM images of C-ORNL-1 along the [001] (FIG. 2B) and [110] (FIG. 2C) directions.

As shown by FIG. 1A, C-ORNL-1 exhibits a type IV nitrogen sorption isotherm with a sharp capillary condensation step at relative pressure from 0.4 to 0.7 and a narrow pore size distribution, centered at 6.3 nm. The calculated BET surface area and pore volume are 607 $m^2/g$ and 0.58 $cm^3/g$, respectively. As shown in FIG. 1B, C-ORNL-1 displays three well-resolved XRD peaks which can be indexed into 100, 110, and 200 deflections of 2D hexagonal symmetry (p6 mm), indicating a highly ordered mesostructure. The highly ordered 2D hexagonal structure of C-ORNL-1 is further revealed by the high resolution SEM image (FIG. 2A) and TEM images (FIGS. 2B and 2C, along the [001] and [110] directions, respectively). As shown in FIG. 2, long-range hexagonal arrangement of porous structure is clearly visible along both the [001] and [110] directions. The cell unit parameter, pore size, and wall thickness of C-ORNL-1 estimated from the images are 12.2 nm, 6.2 nm, and 6.0 nm respectively, which are in good agreement with the values determined from the nitrogen adsorption and XRD results. The unit cell parameter a is calculated to be 12.24 nm and the wall thickness to be 5.94 nm. However, the carbon framework wall of CORNL-1 is amorphous, as indicated by its wide-angle XRD pattern (FIG. 6B).

EXAMPLE 2

Preparation and Analysis of Mesoporous Carbon Material from Catechol-Formaldehyde Polymer (C-ORNL-1-c)

The preparation of mesoporous carbons from catechol-formaldehyde and F127 was conducted similarly to the method described in Example 1 above. In a typical synthesis, 1.1 g of catechol and 1.1 g of F127 were dissolved in 4.5 ml of EtOH, and to this was added 4.5 ml of 4.0M HCl aqueous solution and 1.3 g of 37% formaldehyde. After stirring for about 10 days at room temperature, the clear mixture turned turbid, indicating the formation of RF-F127 nanocomposite and a phase separation. After stirring for a total of 16 days, the mixture was centrifuged at 9500 rpm for 4 minutes in order to completely separate and isolate the polymer-rich gel phase. The gel phase was then cured and carbonized in accordance with the method of Example 1. The produced carbon material is referred to as C-ORNL-1-c.

Figure 3:
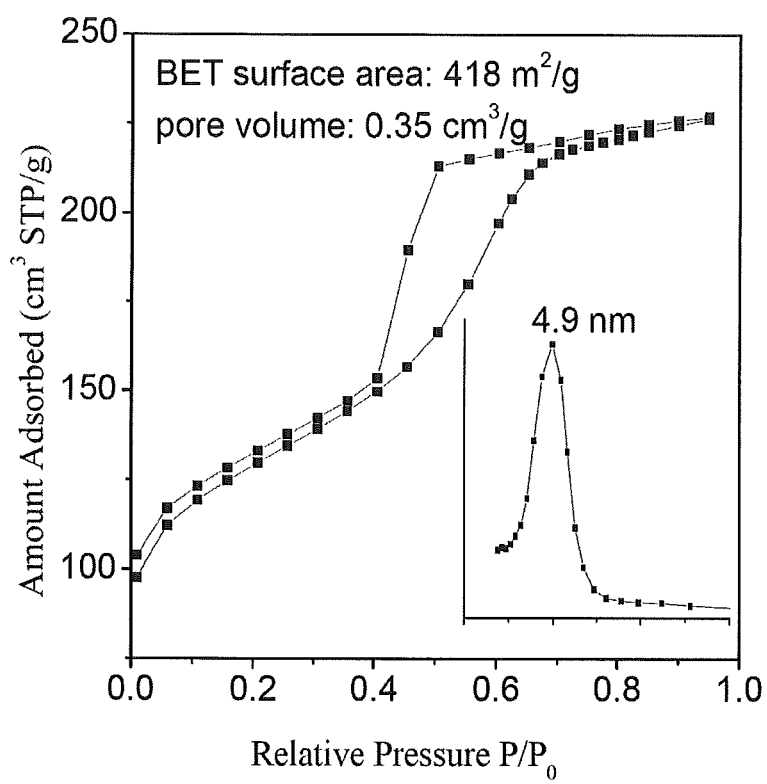
FIG. 3. Nitrogen sorption isotherm of a catechol/formaldehyde/F-127 poloxamer mesoporous carbon material of the invention (denoted as C-ORNL-1-c), along with PSD insert.

As shown by FIG. 3, C-ORNL-1-c exhibits a type IV nitrogen sorption isotherm with a sharp capillary condensation step at relative pressure from 0.4 to 0.7 and a narrow pore size distribution, centered at 4.9 nm. The calculated BET surface area and pore volume are 418 $m^2/g$ and 0.35 $cm^3/g$, respectively.

Figure 4:
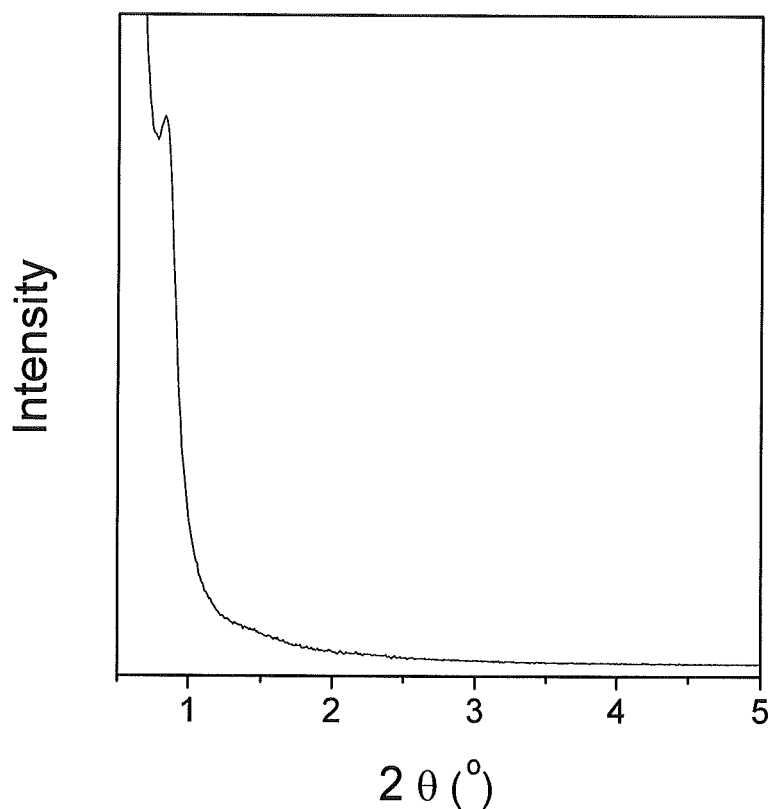
FIG. 4. Low-angle XRD pattern of C-ORNL-1-c.

FIG. 4 shows the low-angle XRD pattern of C-ORNL-1-c. A peak at 2θ=0.83 is observed, which can be indexed into the 100 reflection of 2D hexagonal symmetry (p6 mm). In addition, SEM and TEM images (FIGS. 5A and 5B, respectively) of C-ORNL-1-c clearly show a 2D hexagonal meso-structure and long range ordering.

EXAMPLE 3

Thermal Stability Analysis of the Mesoporous Carbon Materials

As further evidenced below, C-ORNL-1 exhibits an unusually high degree of thermal stability. In particular, FIGS. 6A and 6B show both the low-angle and wide-angle XRD patterns of C-ORNL-1-x (herein x refers to the temperature) after heat-treatment at different temperatures, ranging from 1800° C. to 2600° C. Surprisingly, C-ORNL-1 still exhibits a strong XRD peak at 2θ around 0.8° after being heated even up to 1800° C. The low-angle XRD peak becomes less visible with an increase of heat-treatment temperature, suggesting a gradual loss of mesostructural order. However, the peak position surprisingly does not shift to larger angle, thus indicating an absence of structural shrinkage. The wide-angle XRD patterns of C-ORNL-1-x clearly indicate the gradual development of graphitic character of the carbon walls. Surprisingly, the nitrogen sorption isotherms (FIG. 6C) of C-ORNL-1-x show typical type IV curves, suggesting that mesoporosity is preserved, even after being heated to 2600° C. However, as shown in Table 2 below, the nitrogen uptake as well as the BET surface area of C-ORNL-1-x tend to decrease with increasing heat-treatment temperature. The pore size distribution plots (FIG. 6D) of C-ORNL-1-x show almost identical pore diameters for all samples although the mesopores become broader as the heat treatment temperature increases, as also evidenced in Table 1.

TABLE 2

Structural properties of C-ORNL-1-x

| Materials | a (nm)[1] | Pore size (nm) | Surface area ($m^2/g$) | Pore volume ($cm^3/g$) |
|---|---|---|---|---|
| C-ORNL-1[2] | 12.24 | 6.3 | 607 | 0.58 |
| C-ORNL-1-1800 | 12.20 | 6.2 | 390 | 0.46 |
| C-ORNL-1-2200 | — | 6.3 | 371 | 0.47 |

TABLE 2-continued

Structural properties of C-ORNL-1-x

| Materials | a (nm)[1] | Pore size (nm) | Surface area (m²/g) | Pore volume (cm³/g) |
|---|---|---|---|---|
| C-ORNL-1-2400 | — | 6.4 | 288 | 0.37 |
| C-ORNL-1-2600 | — | 6.6 | 230 | 0.30 |

[1] unit cell parameter a = 2/√3 * $d_{100}$, pore size is referred to the maximum of the pore size distribution plot based on the BJH method, wall thickness = a − pore size;
[2] obtained by carbonization at 850° C.

FIGS. 7A and 7B show high-resolution SEM and TEM images, respectively, of C-ORNL-1 after heat treatment at a temperature of 1800° C. (resulting in material referred to as CORNL-1-1800). FIGS. 7C and 7D show high-resolution SEM and TEM images, respectively, of C-ORNL-1 after heat-treatment at a temperature of 2200° C. (resulting in material referred to as CORNL-1-2200). FIG. 7E shows a high-resolution SEM image of C-ORNL-1 after heat-treatment at a temperature of 2400° C. (resulting in material referred to as CORNL-1-2400). FIG. 7F shows a high-resolution SEM image of C-ORNL-1 after heat-treatment at a temperature of 2600° C. (resulting in material referred to as CORNL-1-2600). The apparent hexagonal arrangement of mesopores is still observed for CORNL-1-1800, suggesting an ordered mesostructure is maintained, which is in good agreement with the results of XRD and nitrogen sorption analysis. The mesoporous carbon materials being heated at higher temperatures (i.e., 2200-2600° C.) exhibit wormy structures (FIGS. 7C-F). Surprisingly, all of the above data indicate that CORNL-1 can be graphitized at 2400° C. or 2600° C. to form a highly graphitic mesoporous carbon while maintaining substantial mesoporosity and BET surface area. The high thermal stability of C-ORNL-1 is believed to be at least partially due to the highly crosslinked resorcinol-formaldehyde polymer and resulting highly rigid carbon framework afforded by the highly acidic conditions used in the present invention. The thick carbon wall is also believed to contribute to the high thermal stability.

While there have been shown and described what are at present considered the preferred embodiments of the invention, those skilled in the art may make various changes and modifications which remain within the scope of the invention defined by the appended claims.

What is claimed is:

1. A method for fabricating a mesoporous carbon material, the method comprising:
providing a precursor composition comprising: (i) a templating component comprised of a block copolymer, (ii) a phenolic compound or material, (iii) a crosslinkable aldehyde component, and (iv) at least 0.5 M concentration of a strong acid having a pKa of or less than −2, wherein said concentration is with respect to the total volume of the precursor composition;
curing the precursor composition to form a cured precursor composition; and
subjecting said cured precursor composition to a carbonization step comprising heating said cured precursor composition at a carbonizing temperature for sufficient time to convert said cured precursor composition to a mesoporous carbon material.

2. The method of claim 1 wherein said block copolymer comprises a poloxamer triblock copolymer.

3. The method of claim 1, wherein said mesoporous carbon material is in the form of a film having a thickness of less than 1 micron.

4. The method of claim 1, wherein said mesoporous carbon material is in the form of a film having a thickness of or less than 100 nm.

5. The method of claim 1, wherein said curing comprises heating the precursor composition at a temperature of at least 80° C. for at least 24 hours.

6. The method of claim 1, wherein said carbonization step comprises heating at a temperature of at least 400° C. for at least 2 hours.

7. The method of claim 1, wherein said strong acid is selected from the group consisting of hydrochloric acid, hydrobromic acid, hydroiodic acid, sulfuric acid, and triflic acid.

8. The method of claim 1, wherein said strong acid is in an effective concentration of at least 1.0 M with respect to the total volume of precursor composition.

9. The method of claim 1, further comprising mixing the components of the precursor composition, prior to curing and carbonization, until a gel-like phase and a liquid phase begin to separate.

10. The method of claim 9, further comprising isolating the gel-like phase from the liquid phase, and subjecting the gel-like phase to the subsequent curing and carbonization steps.

11. The method of claim 1, wherein said crosslinkable aldehyde component comprises formaldehyde.

* * * * *